(12) United States Patent
Wolgast

(10) Patent No.: US 10,279,705 B2
(45) Date of Patent: May 7, 2019

(54) SEAT RAIL ADAPTER COMPRISING TWO MOUNTING PARTS, SEAT RAIL AND CABIN ARRANGEMENT COMPRISING SUCH A SEAT RAIL ADAPTER

(71) Applicant: Airbus Operations GmbH, Hamburg (DE)

(72) Inventor: Carsten Wolgast, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 15/784,480

(22) Filed: Oct. 16, 2017

(65) Prior Publication Data

US 2018/0118056 A1    May 3, 2018

(30) Foreign Application Priority Data

Oct. 31, 2016 (EP) .................... 16196648

(51) Int. Cl.
*F16M 11/38* (2006.01)
*B60N 2/07* (2006.01)
*B60N 2/015* (2006.01)
*B64D 11/06* (2006.01)

(52) U.S. Cl.
CPC ....... *B60N 2/0715* (2013.01); *B60N 2/01516* (2013.01); *B60N 2/0722* (2013.01); *B64D 11/0696* (2013.01)

(58) Field of Classification Search
CPC ..... B64D 11/0696; B60P 7/0815; B64C 1/18; B64C 1/20
See application file for complete search history.

(56) References Cited

U.S. PATENT DOCUMENTS 6,488,249 B1 * 12/2002 Girardi ............. B60N 2/01541
                                                            248/424
7,370,832 B2 *  5/2008 Frantz ...................... B64C 1/20
                                                            244/118.6
(Continued)

FOREIGN PATENT DOCUMENTS

DE         102 29 385 A1    1/2003
DE    10 2009 004987 A1    7/2010
(Continued)

OTHER PUBLICATIONS

May 9, 2017 Search Report EP 16 19 6648.

*Primary Examiner* — Amy J. Sterling
(74) *Attorney, Agent, or Firm* — Lerner, David, Littenberg, Krumholz & Mentlik, LLP

(57) ABSTRACT

A seat rail adapter for flexibly mounting an object onto a seat rail, a seat arrangement and a cabin arrangement with same are described. The seat rail has a U-shaped profile with a lower flange, two web portions, two upper flanges, a gap between the upper flanges, and a cavity inside the seat rail. The seat rail adapter includes two mounting parts capable of being inserted through the gap into the cavity inside the seat rail, such that, when inserted, a hook portion of each of the mounting parts is engaged with the cavity, and a shaft portion of each of the two mounting parts extends through the gap to outside the seat rail. Further, the shaft portions include a rounding so as to allow insertion of one mounting part into the cavity by a swivel movement, when the other mounting part is already inserted therein.

14 Claims, 8 Drawing Sheets

(56) References Cited

U.S. PATENT DOCUMENTS

| | | | | |
|---|---|---|---|---|
| 8,448,911 | B2* | 5/2013 | Wilhelm | B64C 1/18 |
| | | | | 248/298.1 |
| 8,567,741 | B2 | 10/2013 | Roming et al. | |
| 8,668,181 | B2* | 3/2014 | Dazet | B60P 7/0807 |
| | | | | 244/118.1 |
| 8,845,249 | B2* | 9/2014 | Rowles | B60P 7/0815 |
| | | | | 410/105 |

FOREIGN PATENT DOCUMENTS

| | | |
|---|---|---|
| DE | 10 2009 039 581 A1 | 3/2011 |
| DE | 10 2015 117 709 A1 | 4/2017 |

* cited by examiner

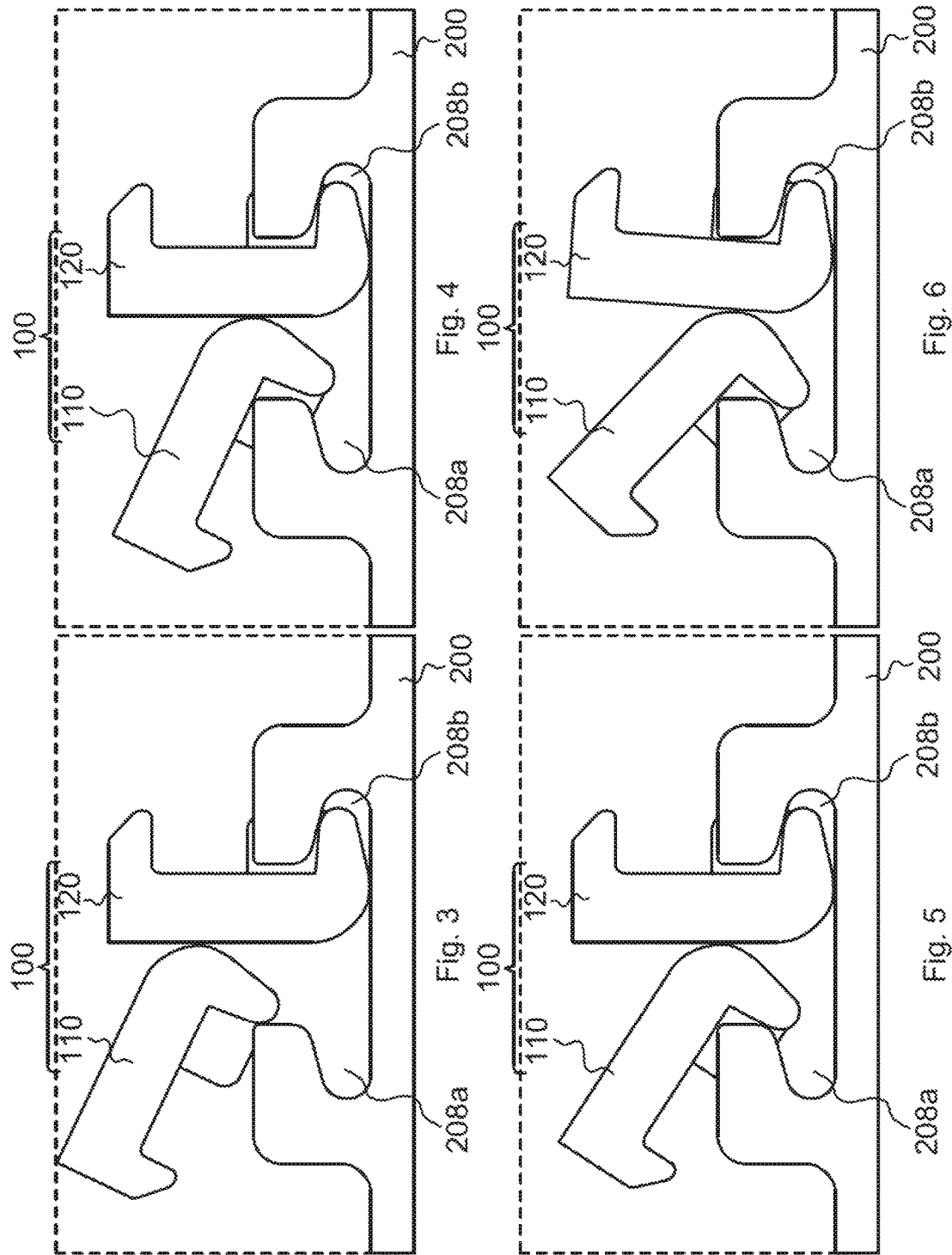

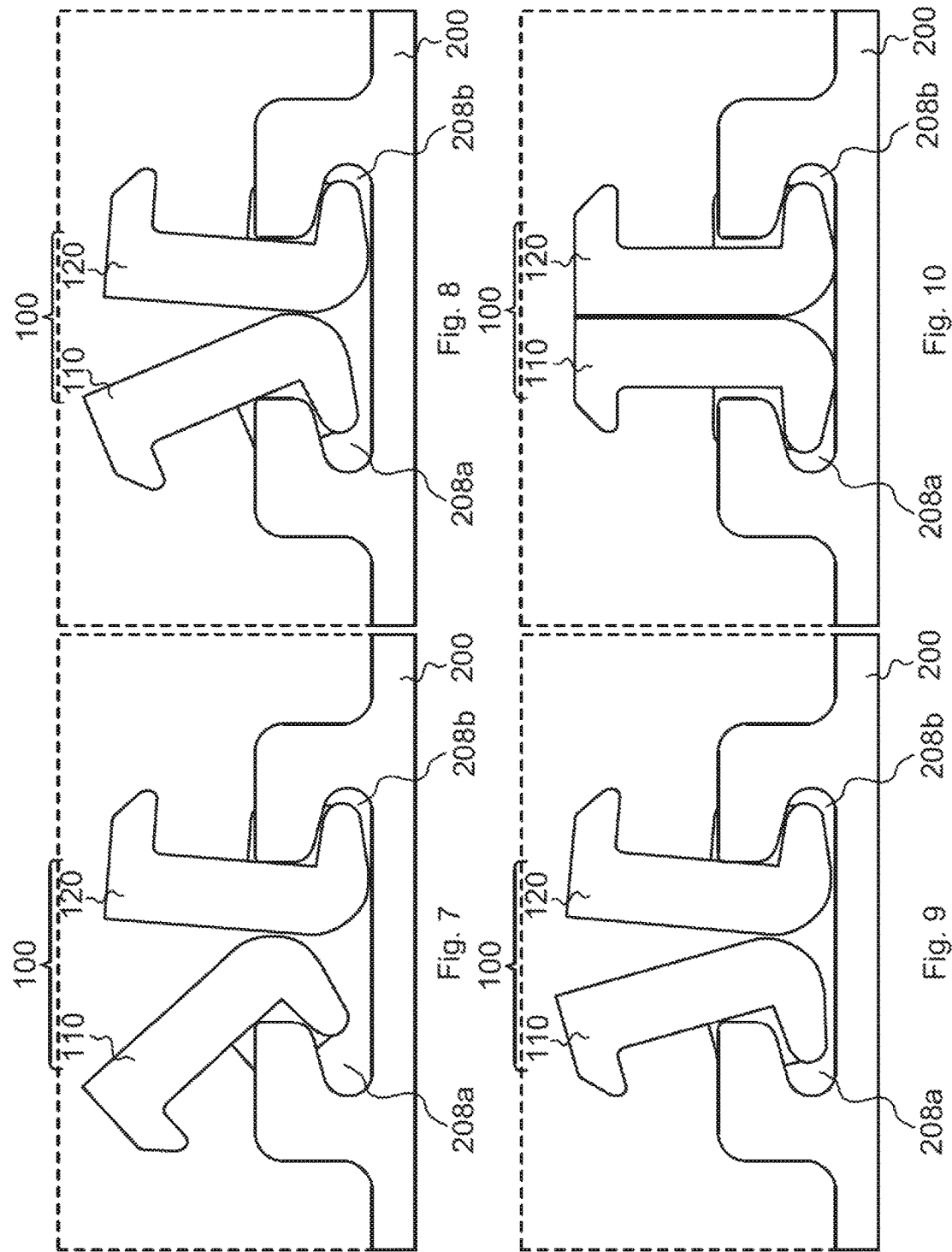

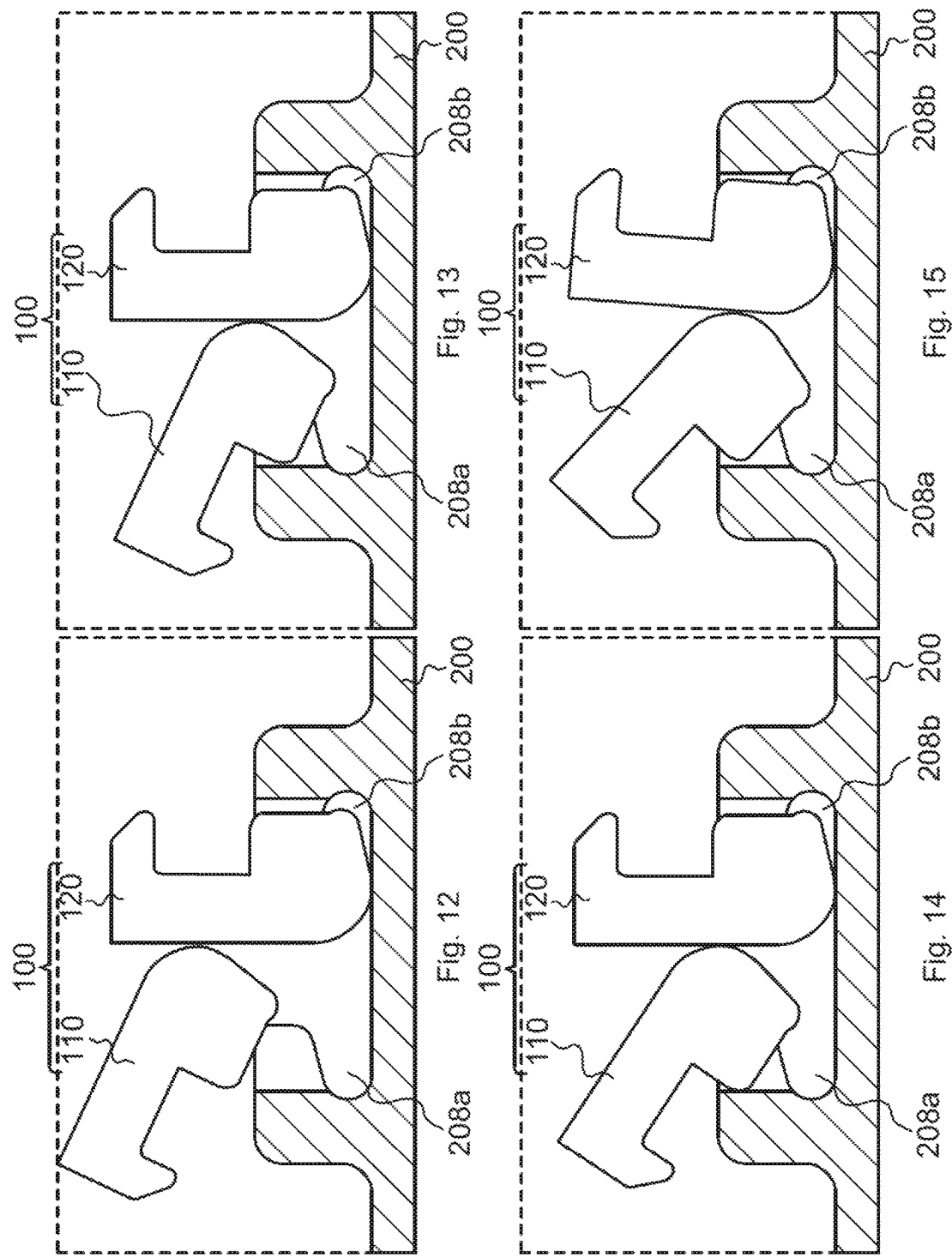

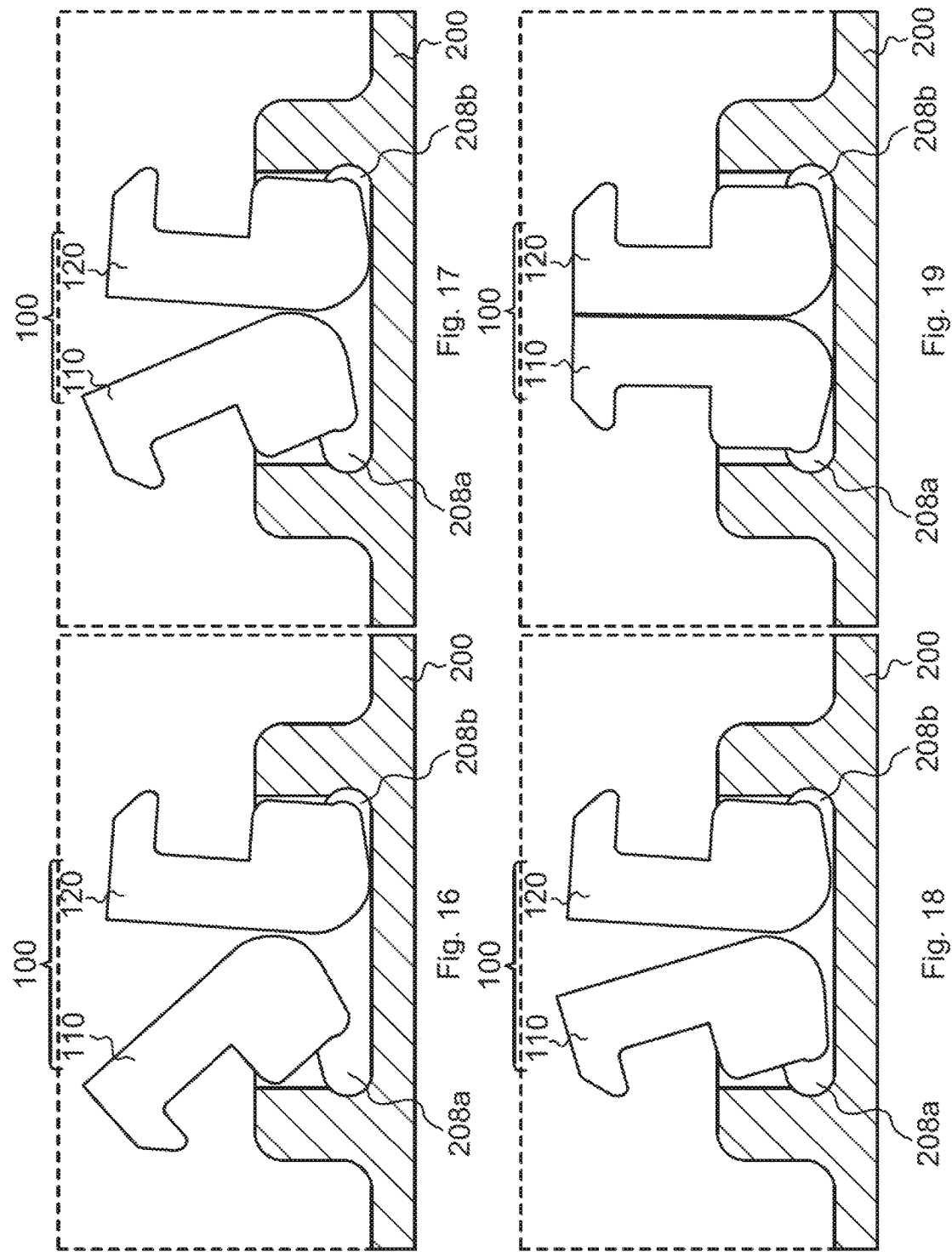

SEAT RAIL ADAPTER COMPRISING TWO MOUNTING PARTS, SEAT RAIL AND CABIN ARRANGEMENT COMPRISING SUCH A SEAT RAIL ADAPTER

FIELD OF THE INVENTION

The invention relates to a seat rail adapter comprising two mounting parts, a seat rail arrangement and a cabin arrangement comprising such a seat rail adapter with the two mounting parts.

BACKGROUND OF THE INVENTION

Conventionally, seat rail adapters are known to mount objects, for example seats, structural elements or cargo onto a seat rail in a vehicle. Such seat rail adapters are commonly used in transportation vehicles, such as aircrafts, trains and busses.

In the art, various types of seat rail adapters are known. For example, seat rail adapters exist in the shape of a rail to allow a flexible mounting of objects thereon. Seat rail adapters in a rail shape enable objects, for instance seats, to be slidably positioned on the seat rail adapter, thereby allowing the flexible mounting without restrictions by a grid of the seat rail.

An exemplary seat rail adapter in a rail shape is disclosed in DE 10 2015 117 709. This seat rail adapter comprises multiple elements with separate functions. Notably, the different elements have to be secured to each other with fastening elements, such as screws, to provide a fixed basis for mounting an aircraft seat.

The known seat rails, for example of commercial aircrafts, are used for attaching passenger seats, and are standardized, for example according to the aviation standard LN 29 890, which in its edition 1971-05 is incorporated herein by reference.

Such seat rails share a common configuration, where on a lower support element, preferably on a Ω-shaped or a T-shaped lower support element, a profile element, preferably a U-shaped profile element, is arranged. The profile element, in particular the U-shaped profile element preferably comprises a gap that points upward, i.e. into the cabin. This gap is provided between two inward projecting flanges. The gap is configured with holes (or widenings) and slits (or neckings) in alternating succession, thereby defining a grid of the seat rail.

An exemplary seat rail with such a profile element is disclosed in DE 10 2009 039 581. This seat rail is a hard coated seat rail where at least the support element for attaching seats is manufactured from aluminum or aluminum alloy. The surface of the aluminum or the aluminum alloy includes an oxide layer that has been manufactured by means of hard anodic oxidation.

BRIEF SUMMARY OF THE INVENTION

An aspect of the invention proposes a seat rail adapter which allows an easy and convenient mechanism for inserting a seat rail adapter in the seat rail while at the same time allowing for a fast reconfiguration of an object's mounting position on the seat rail.

According to a first aspect of the invention, a seat rail adapter is proposed for flexibly mounting an object onto a seat rail.

The seat rail extends along a rail longitudinal axis and has a U-shaped profile or C-shaped profile comprising a lower flange portion, a first web portion extending upwards from the lower flange portion, and a second web portion extending upwards from the lower flange portion in a position spaced apart from the first web portion so as to form a cavity between the lower flange portion, the first web portion and the second web portion. The U-shaped profile of the seat rail further comprises a first upper flange portion extending from the first web portion inwardly towards the second web portion so as to form a first cavity section between the lower flange portion, the first web portion and the first upper flange portion. The U-shaped profile of the seat rail also comprises a second upper flange portion extending from the second web portion inwardly towards the first web portion so as to form a second cavity section between the lower flange portion, the second web portion and the second upper flange portion. A gap is provided between the first upper flange portion and the second upper flange portion in order to allow access to the cavity from outside the seat rail.

The seat rail adapter comprises a first mounting part and a second mounting part. Both, the first mounting parts and the second mounting part are configured to be inserted through the gap into the cavity of the seat rail and to engage with the cavity. The first mounting part extends along a first longitudinal adapter axis and has a profile comprising a first shaft portion and a first hook portion. The first shaft portion has an inner side and an opposite outer side as well as an upper end and an opposite lower end. The first hook portion projects away from the outer side at the lower end of the first shaft portion. The second mounting part extends along a second longitudinal adapter axis and has a cross-profile comprising a second shaft portion and a second hook portion. The second shaft portion has an inner side and an opposite outer side as well as an upper end and an opposite lower end. The second hook portion projects from the outer side at the lower end of the second shaft portion.

The first and second mounting parts are formed to engage with the cavity of the seat rail in such a manner that a) the first hook portion engages with the first cavity section while the second hook portion engages with the second cavity section, b) that the first shaft portion and the second shaft portion extend from the cavity through the gap to outside the seat rail while the inner side of the first shaft portion lies opposite the inner side of the second shaft portion, and c) that the first longitudinal adapter axis and the second longitudinal adapter axis are aligned with the rail longitudinal axis. The inner side at the lower end of the first shaft portion of the first mounting part and/or the inner side at the lower end of the second shaft portion of the second mounting part is rounded so as to allow insertion of one of the first and second mounting parts into the cavity by a swivel movement, when the other one of the first and second mounting parts is already inserted in the cavity.

Advantageously, this configuration of a seat rail adapter provides an easy and convenient mechanism for inserting a seat rail adapter in the seat rail while at the same time allowing for a fast reconfiguration of an object's mounting position on the seat rail.

In a preferred embodiment of the seat rail adapter, according to the invention, the first and second mounting parts are formed such that the swivel axis for inserting one of the first and second mounting parts into the cavity, when the other one of the first and second mounting parts is already inserted, extends along a tip of the hook portion of the mounting part. Advantageously, this definition of the swivel axis provides for a small radius to the rounded (or curved) lower end of the inner side of the at least one of the two mounting parts, thereby enlarging the inner surface at which the shaft portions of both mounting parts may abut on each other.

In another preferred embodiment of the seat rail adapter, according to the invention, when the first and second mounting parts are inserted into the cavity, the first shaft portion and the second shaft portion extend in parallel through the gap to the outside of the seat rail. Advantageously, this configuration of the shafts portions extending in parallel to one another enables the two mounting parts to support each other, thereby achieving a stable mounting position.

In a further preferred embodiment of the seat rail adapter, according to the invention, when the first and second mounting parts are inserted into the cavity, the first shaft portion and the second shaft portion abut one another. Advantageously, this configuration of the shafts abutting one another allows the two mounting parts to self-support each other, thereby achieving an even more stable mounting position.

In yet another preferred embodiment of the seat rail adapter, according to the invention, when the first and second mounting parts are inserted into the cavity, the projecting first and second hook portions both point in opposite directions. Advantageously, this construction of the two mounting parts allows the hook portions thereof to engage securely with the first and second cavity sections provided by the seat rail.

In an even further preferred embodiment, according to the invention, the seat rail adapter further comprises a fastening element for fastening the first shaft portion to the second shaft portion, when the first and second mounting parts are inserted into the cavity. Advantageously, the fastening element maintains the two mounting parts in the inserted position in the seat rail. At the same time the fastening element does not secure the seat rail adapter to the seat rail.

In another preferred embodiment of the seat rail adapter, according to the invention, the fastening element is one of a screw, a bolt, a nut or another element suitable for providing a releasable connection between the two mounting parts. In such a way, reliable, simple and quick fastening is possible.

In a further preferred embodiment of the seat rail adapter, according to the invention, when the first and second mounting parts are inserted into the cavity, the upper end of the first shaft portion and the upper end of the second shaft portion are configured to form, together, a support for flexibly mounting the object. Advantageously, this configuration of the upper ends of the first and second shaft portions equally distributes the load onto both mounting parts, thereby minimizing the risk of an uneven wear of the seat rail.

In yet another preferred embodiment of the seat rail adapter, according to the invention, the first shaft portion at its outer side above the first hook portion is provided with a first structure configured to engage with a corresponding first counter structure provided at a tip of the first upper flange portion that points to the second upper flange portion of the seat rail, and/or wherein the second shaft portion at its outer side above the second hook portion is provided with a second structure configured to engage with a corresponding second counter structure provided at a tip of the second upper flange portion that points to the first upper flange portion of the seat rail. Advantageously, this configuration of the outer sides of the first and second shaft portion secures the seat rail adapter along the longitudinal rail axis.

In an even further preferred embodiment of the seat rail adapter, according to the invention, the first structure is formed as a plurality of subsequent widenings and neckings alternating along the first longitudinal adapter axis, adapted to engage with the first counter structure formed as corresponding neckings and widenings alternating along the rail longitudinal axis and/or wherein the second structure is formed as a plurality of subsequent widenings and neckings alternating along the second longitudinal adapter axis, adapted to engage with the second counter structure formed as corresponding neckings and widenings alternating along the rail longitudinal axis. Advantageously, this configuration of the outer sides of the first and second shaft portion further secures the seat rail adapter in the longitudinal direction in the seat rail.

In another preferred embodiment of the seat rail adapter, according to the invention, the widenings of the first structure and the neckings of the first counter structure are formed as segments of a cylinder, and/or wherein the widenings of the second structure and the neckings of the second counter structure are formed as segments of a cylinder. Advantageously, this configuration of the outer sides of the first and second shaft portion even further secures the seat rail adapter in the longitudinal direction in the seat rail.

In a further preferred embodiment of the seat rail adapter, according to the invention, the neckings of the first structure and the widenings of the first counter structure are formed as flat sections connecting two adjacent segments of a cylinder, and/or wherein the neckings of the second structure and the widenings of the second counter structure are formed as flat sections connecting two adjacent segments of a cylinder. Advantageously, this configuration of the outer sides of the first and second shaft portion enables a symmetrical construction thereof with first and second upper flange portions.

In a second aspect of the invention, a seat rail arrangement is suggested, comprising a seat rail extending along a rail longitudinal axis and having a U-shaped profile with a lower flange portion, a first web portion extending upwards from the lower flange portion, a second web portion extending upwards from the lower flange portion spaced apart from the first web portion so as to form a cavity between the lower flange portion, the first web portion and the second web portion, a first upper flange portion extending from the first web portion inwardly towards the second web portion so as to form a first cavity section between the lower flange portion, the first web portion and the first upper flange portion, and a second upper flange portion extending from the second web portion inwardly towards the first web portion so as to form a second cavity section between the lower flange portion, the second web portion and the second upper flange portion, wherein a gap is provided between the first upper flange portion and the second upper flange portion in order to allow access to the cavity from outside the seat rail; and a seat rail adapter according to one of the embodiments described before.

Advantageously, this configuration of a seat rail arrangement also provides an easy and convenient mechanism for inserting a seat rail adapter in the seat rail while at the same time allowing for a fast reconfiguration of an object's mounting position on the seat rail.

According to a third aspect of the invention a cabin arrangement is proposed, comprising a seat rail extending along a rail longitudinal axis and having a U-shaped profile with a lower flange portion, a first web portion extending upwards from the lower flange portion, a second web portion extending upwards from the lower flange portion spaced apart from the first web portion so as to form a cavity between the lower flange portion, the first web portion and the second web portion, a first upper flange portion extending from the first web portion inwardly towards the second web portion so as to form a first cavity section between the lower flange portion, the first web portion and the first upper flange portion, and a second upper flange portion extending from the second web portion inwardly towards the first web portion so as to form a second cavity section between the lower flange portion, the second web portion and the second upper flange portion, wherein a gap is provided between the first upper flange portion and the second upper flange portion in order to allow access to the cavity from outside the seat rail; an object; and a seat rail adapter for flexibly mounting the object onto the cabin, wherein the seat rail adapter is configured according to one of the embodiments described before.

Advantageously, this configuration of a cabin arrangement also provides an easy and convenient mechanism for inserting a seat rail adapter in the seat rail while at the same time allowing for a fast reconfiguration of an object's mounting position on the seat rail.

In a preferred embodiment of the cabin arrangement, according to the invention, the object to be mounted is one of a seat, a structural element, or cargo.

In the following, the invention will be explained in more detail with reference being made to the embodiment depicted in the accompanying drawing, by way of example only.

BRIEF DESCRIPTION OF THE DRAWINGS

FIGS. 3-10 illustrate a procedure of inserting a seat rail adapter according to the one embodiment of the invention in a seat rail, namely along the cross section A-A indicated in FIG. 1;

FIGS. 12-19 illustrate a method of inserting a seat rail adapter according to the one embodiment of the invention in a seat rail, namely along the cross section B-B indicated in FIG. 1.

DETAILED DESCRIPTION

Figure 1:
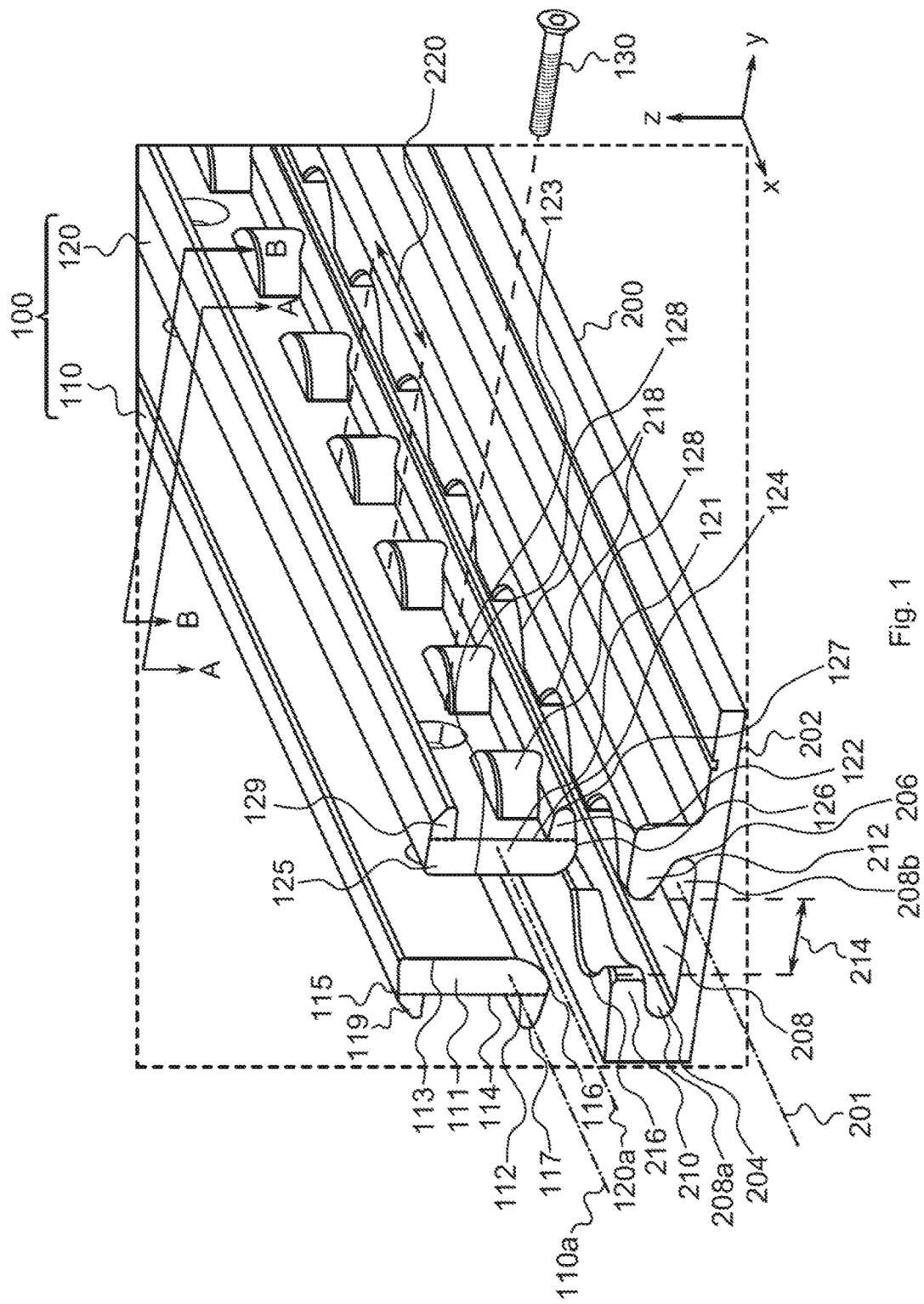
FIG. 1 shows a perspective view of a seat rail adapter comprising two mounting parts according to one embodiment of the invention and a seat rail for insertion therein.

Referring now to FIG. 1, a perspective view of the seat rail adapter 100 according to one embodiment of the invention is shown. Particularly, in FIG. 1 the seat rail adapter 100 is illustrated separate from a seat rail 200, in form of an exploded assembly drawing. Further to FIG. 1, two cross-sections are indicated along the lines A-A and B-B which are substantially perpendicular to a rail longitudinal direction (i.e. extending along the x-axis in FIG. 1) of the seat rail 200. These cross-sections A-A and B-B help understanding the remaining drawings of the seat rail adapter 100.

In more detail, the cross-section along the line A-A is further detailed in FIG. 2-10, where the cross-section is in alignment with one of the widenings of the seat rail 200. Further, the cross-section along the line B-B is further detailed in FIGS. 11-19, where the cross-section is in alignment with one of the neckings of the seat rail 200. In other words, the lines A-A and B-B are spaced apart by half of a grid pitch 220 in the longitudinal rail axis (i.e. along the x-axis in FIG. 1). The term grid pitch 220 refers to the distance between two consecutive widenings (or two consecutive neckings) in the longitudinal rail axis.

The seat rail adapter 100 of this embodiment is configured for flexibly mounting an object onto the seat rail 200, wherein the object can be one of an aircraft seat, a structural element or cargo. In particular, this aircraft adapter 100 overcomes the disadvantages of discrete mounting position corresponding to a grid of the seat rail.

In particular, the seat rail adapter 100 mounts objects independently of pre-configured mounting positions, thereby enabling continuous, non-discrete mounting position of objects along the longitudinal rail axis. The object may be slidably positioned on the seat rail adapter 100 facilitating the flexible mounting without restrictions by a grid of the seat rail.

In the context of the invention, a seat rail adapter allows a flexible mounting of an object, if the mounting position thereof is not restricted by the grid of the seat rail. In other words, the seat rail adapter flexibly mounts objects on a support, where the objects can be slidably positioned on before securing them to the seat rail adapter. This enables the mounting position of the object to be adjustable in steps smaller than the grid pitch.

The seat rail 200 extends along a rail longitudinal axis 201 (in parallel to the x-axis in FIG. 1). This rail longitudinal axis 201 of the seat rail 200 conventionally corresponds to the longitudinal axis of the aircraft cabin and extends along the entire length thereof.

Further, the seat rail 200 has a U-shaped profile when viewed from across the rail longitudinal axis 201 (i.e. has a U-shaped cross-section in the plane defined by the y- and z-axis in FIG. 1). The seat rail 200 comprises a lower flange portion 202. The lower flange portion 202 is a horizontal lower flange portion (i.e. extend along the x-axis in FIG. 1). Further, the lower flange portion 202 is configured to be mounted or rest against the floor of an aircraft cabin.

The seat rail 200 further comprises a first web portion 204 extending upwards from the lower flange portion 202, and a second web portion 206 extending upwards from the lower flange portion 202 spaced apart from the first web portion 204. The first and the second web portions 204, 206 are vertical web portions (i.e. extend along the z-axis in FIG. 1). Further, the first and the second web portions 204, 206 are both arrange in parallel to each other.

The first and the second web portions 204, 206 are arranged so as to form a cavity 208 between the lower flange portion 202, the first web portion 204 and the second web portion 206. In other words, the lower flange portion 202, and the first and second web portions 204, 206 surround the cavity 208 of the seat rail 200.

The seat rail 200 further comprises a first upper flange portion 210 that extends from the first web portion 204 inwardly towards the second web portion 206. The seat rail 200 also comprises a second upper flange portion 212 that extends from the second web portion 206 inwardly towards the first web portion 204.

The first and second upper flange portions 210, 212 respectively are horizontal upper flange portions (i.e. extend along the x-axis in FIG. 1) arranged in parallel to the lower flange portion 202. The first and second upper flange portions 210, 212 further surround the cavity 208 formed by the lower flange portion 202, the first web portion 204 and the second web portion 206.

In particular, the first upper flange portion 210 extends inwardly from the first web portion 204 so as to form a first cavity section 208a between the lower flange portion 202, the first web portion 204 and the first upper flange portion 210. The second upper flange portion 211 extends inwardly from the second web portion 206 so as to form a second cavity section 208b between the lower flange portion 202, the second web portion 204 and the second upper flange portion 212. The first and second cavity sections 208a, 208b are parts of the cavity 208.

Further to the seat rail 200, a gap 214 is provided between the first upper flange portion 210 and the second upper flange portion 212. This gap 214 is provided in order to allow access to the cavity 208 from outside the seat rail 200, namely to allow access to the seat rail adapter 100. The seat rail adapter 100 comprises a first mounting part 110 and a second mounting part 120, both configured to be inserted through the gap 214 of the seat rail 200 and configured to engage with the cavity 208 of the seat rail 200. Thereby, the seat rail adapter enables mounting the objects, such as aircraft seats, structural elements, and/or cargo, onto the seat rail 200.

For this purpose, each of the first and second mounting parts 110, 120 of the seat rail adapter 100 comprises a first or second shaft portion 111, 121 and a first or second hook portion 112, 122, respectively. In short, the first and second hook portions 112, 122 are configured to engage with the cavity 208 of the seat rail 200 whereas the first and second shaft portions 111, 121 of the first and second mounting parts 110, 120 establish a mechanical connection to the outside of the seat rail 200.

In one example, the first and second mounting parts 110, 120 are each formed as one piece. Then, the first and second shaft portion 111, 121 can only be distinguished from the respective first and second hook portion 112, 122 through its function. In another example the first and second shaft portion 111, 121 and the first and second hook portions 112, 122 are each formed as separate pieces, which are joined together to form the first and second mounting parts 110, 120.

In the context of the invention, the first and second mounting parts 110, 120 shall each be understood as one (i.e. single) unit which cannot be disassembled into separate pieces after its assembly. In other words, the first and second mounting parts have a fixed geometry and dimension which, as such, enables them to be inserted through the gap 214 and to engage with the cavity 208 of the seat rail 200.

The following description of the first and second mounting parts 110, 120 focusses on the case where both mounting parts are inserted in the cavity 208 of the seat rail 200. This serves the purpose to characterize the configuration of the first and second mounting parts 110, 120 that allows the mounting parts to engage with the cavity 208. Irrespective thereof, it shall again be emphasized that each of the first and second mounting parts 110, 120 is removable from the seat rail 200, hence independent therefrom.

The first mounting part 110 of the seat rail adapter 100 extends along a first longitudinal adapter axis 110a (i.e. extends in parallel to the x-axis in FIG. 1) and has a cross-profile (i.e. in the plane defined by the y- and z-axis in FIG. 1) comprising a first shaft portion 111 and a first hook portion 112. In other words, the first mounting part 110 has a C-shaped or L-shaped profile when viewed across the first longitudinal adapter axis 110a (i.e. in a plane along the y- and z-axis in FIG. 1).

Particularly, the first shaft portion 111 of the first mounting part 110 is a vertical first shaft portion (i.e. extends along the z-axis in FIG. 1) and the first hook portion 112 thereof is a horizontal first hook portion (i.e. extends along the x-axis in FIG. 1).

The first shaft portion 111 of the first mounting part 110 has an inner side 113 and an opposite outer side 114. The inner and outer sides 114, 116 of the first shaft portion 111 extend along the first longitudinal adapter axis 110a (i.e. extend along the x-axis in FIG. 1). In other words, the inner and outer sides are lateral sides of the first shaft portion 111 with respect to the first longitudinal adapter axis 110a (i.e. along the x-axis in FIG. 1).

Further, the first shaft portion 111 of the first mounting part 110 has an upper end 115 and an opposite lower end 116. The first hook portion 112 projects horizontally from the outer side 114 (i.e. extends along the y-axis in FIG. 1) at the lower end 116 of the first shaft portion 111. In other words, the first hook portion 112 of the first mounting part 110 forms at the lower end 116 of the first shaft portion 111 a horizontal projection (i.e. extending along the y-axis in FIG. 1) with respect to the outer side 114 of the first shaft portion 111.

Further, the second mounting part 120 of the seat rail adapter 100 extends along a second longitudinal adapter axis 120a (i.e. extends in parallel to the x-axis in FIG. 1) and has a cross-profile (i.e. in the plane defined by the y- and z-axis in FIG. 1) comprising a second shaft portion 121 and a second hook portion 122. In other words, the second mounting part 120 has a C-shaped or L-shaped profile when viewed across the second longitudinal adapter axis 120a (i.e. in a plane along the y- and z-axis in FIG. 1).

Particularly, the second shaft portion 121 of the second mounting part 120 is a vertical second shaft portion (i.e. extends along the z-axis in FIG. 1) and the second hook portion 122 thereof is a horizontal second hook portion (i.e. extends along the x-axis in FIG. 1).

The second shaft portion 121 of the second mounting part 120 has an inner side 123 and an opposite outer side 124. The inner and outer sides 124, 126 of the second shaft portion 121 extend along the second longitudinal adapter axis 120a (i.e. extend along the x-axis in FIG. 1). In other words, the inner and outer sides are lateral sides of the second shaft portion 121 with respect to the second longitudinal adapter axis 120a (i.e. along the x-axis in FIG. 1).

Further, the second shaft portion 121 of the second mounting part 120 has an upper end 125 and an opposite lower end 126. The second hook portion 122 projects horizontally from the outer side 124 (i.e. extends along the y-axis in FIG. 1) at the lower end 126 of the second shaft portion 121. In other words, the second hook portion 122 of the second mounting part 120 forms at the lower end 126 of the second shaft portion 121 a horizontal projection (i.e. extending along the y-axis in FIG. 1) with respect to the outer side 124 of the second shaft portion 121.

At the upper ends 115, 125 the first and second shaft portions 111, 121 are configured to form, together, a support for flexibly mounting the object, when the first and second mounting parts 110, 120 are inserted into the cavity 208. In particular, the upper ends 115, 125 of the first and second shaft portions 111, 121 form a flat surface to support the stable mounting of objects thereon.

In general, the first and second mounting parts 110, 120 are formed such that they, when inserted, engage with the cavity 208 of the seat rail 200. This engagement of the first and second mounting parts 110, 120 with the cavity 208 of the seat rail 200 characterizes the geometry and dimensions of the first and second mounting parts 110, 120 as shall become apparent from the following.

Firstly, the first and second mounting parts 110, 120 are configured such that, when inserted, the first hook portion 112 engages with the first cavity section 208a while the second hook portion 122 engages with the second cavity section 208b. In other words, the first and second hook portion 112, 122 respectively project into the first and second cavity section 208a, 208b under the first and second upper flange portions 210, 212 of the seat rail 200.

Secondly, the first and second mounting parts 110, 120 are configured such that, when inserted, the first shaft portion 111 and the second shaft portion 121 extend from the cavity 208 through the gap 214 to outside the seat rail 200. The inner side 113 of the first shaft portion 111 lies opposite the inner side 123 of the second shaft portion 121. Also at least parts of the outer side 114 of the first shaft portion 111 lies opposite the first upper flange portion 210 and at least parts of the outer side 124 of the second shaft portion 121 lies opposite the second upper flange portion 212 of the seat rail 200.

Finally, the first and second mounting parts 110, 120 are configured such that, when inserted, the first longitudinal adapter axis 110a and the second longitudinal adapter axis 120a are aligned with the rail longitudinal axis 201. In other words, the first mounting part 110 and the second mounting part 120 of the seat rail adapter 100 extend, when in engagement with the cavity 208 of the seat rail adapter 200, in parallel to each other and also are in parallel to the rail longitudinal axis 201.

Accordingly, when the first and second mounting parts 110, 120 are inserted into the cavity 208 of the seat rail, the first shaft portion 111 and the second shaft portion 121 extend in parallel through the gap 214 to the outside of the seat rail 200. At the same time, when the first and second mounting parts 110, 120 are inserted into the cavity 208, the projecting first and second hook portions 112, 122 both point in opposite directions.

Advantageously, the inner side 113 at the lower end 116 of the first shaft portion 111 of the first mounting part 110 and the inner side 123 at the lower end 126 of the second shaft portion 121 of the second mounting part 120 are rounded. However, not necessarily both of the inner sides 113, 123 of the first and second shaft portions 111, 121 need to be rounded at the lower end 116, 126, as apparent form the following.

The rounding at the lower ends 116, 126 allows insertion of one of the first and second mounting parts 110, 120 into the cavity 208 by a swivel movement, when the other one of the first and second mounting parts 110, 120 is already inserted in the cavity 208. Specifically, at least that one of the first and second mounting parts 110, 120 which performs the swivel movement has at the lower end 116, 120 the respective inner side 113, 123 with the rounding.

For the at least one of the first and second mounting parts 110, 120, the rounding of the inner side 113, 123 is arranged on an opposite lower end as the first and second hook portion 112, 122. Thus, the rounding of the inner side 113, 123 of the respective first and second shaft portion 111, 121 enables the first and second hook portion 112, 122 to be inserted into and engage with the first and second cavity section 208a, 208b of the seat rail 200, respectively.

In more detail, with the swivel movement the first and second mounting parts 110, 120 are inserted through the gap 214 into the cavity 208. At least one of the first and second mounting parts 110, 120 performs a swivel movement around the first and second upper flange portion 210, 212 of the seat rail 200, respectively, to assume the (final) state in which the first and second hook portions 112, 122 engage with the respective first and second cavity section 208a, 208b of the cavity 208.

Thereby, the first and second hook portion 112, 122 are first inserted into the cavity 208 of the seat rail 200 through the gap 214 in between the first and second upper flange portions 210, 212, and thereafter at least parts of the first and second shaft portion 111, 121 follow through the gap 214 into the cavity 208 such that the first and second hook portion 112, 122 can engage with the first and second cavity portion of cavity 208 as described above.

Specifically, the first and second mounting parts 110, 120, particularly the rounding, are formed such that the swivel movement is enabled. In this respect, the first and second mounting parts 110, 120 are formed such that the swivel axis for inserting one of the first and second mounting parts 110 120 into the cavity 208, extends along a tip 117, 127 of the hook portion 112, 122 of the respective one of the first and second mounting parts 110, 120.

In other words, the swivel axis for inserting the at least one of the first and second mounting parts 110, 120 extends along the respective first or second longitudinal adapter axis 110a, 120a, namely along the first or second hook portion 112, 122 at the (outer) distal end thereof with respect to the rounding of the inner surface 113, 123 of the first or second shaft portion 111, 121.

In summary, the first and the second hook portions 112, 122 are configured to engage with the first and second cavity section 208a, 208b of cavity 208 of the seat rail 200.

On the one hand, this configuration of the first and second hook portions 112, 122 prevents the first and second mounting parts 110, 120 from being removable with (only) a translational movement in the vertical direction (i.e. along the z-axis in FIG. 1). On the other hand, this configuration of the first and second hook portions 112, 122 also prevents the first and second mounting parts 110, 120 from being inserted with (only) the translational movement in the vertical direction (i.e. along the z-axis in FIG. 1).

Advantageously, the rounding of the inner side 113, 123 of the first and second shaft portion 111, 121 enables inserting one of the first and second mounting parts 110, 120 with a swivel movement (i.e. with a rotation movement), when the other mounting part is already inserted in the cavity 208. In other words, the rounding of the inner side 113, 123 is configured according to the swivel movement that is required for the respective one of the first and second hook portion 112, 122 to engage with the first or second cavity section 208a, 208b.

Consequently, the first and second hook portions 112, 122 are configured to engage with the cavity 208 of the seat rail 200 in order to enable a stable mounting of objects on the seat rail adapter 100. Thereby, when the first and second mounting parts 110, 120 are in engagement, they are blocked from displacing along a vertical direction (i.e. along the z-axis in FIG. 1).

Notably, a distinction is made between inserting the first and second mounting parts 110, 120 and the engagement thereof with the cavity 208. These two terms differ in that one refers to a procedure and the other refers to a (final) position for the seat rail adapter 100 in the seat rail 200 as apparent from the following.

In the context of the invention, the term inserting/inserted shall be understood as the procedure according to which, at first, one of the first and second mounting parts 110, 120 is inserted in the cavity, and then, the other one of the first and second mounting parts 110, 120 is inserted by use of the swivel movement. Further in the context of the invention, the term engagement/engaged shall be understood as a (final) state or position where each one of the first and second hook portions 112, 122 of the first and second mounting parts 110, 120 engages with the cavity 208, hence, assumes a final position in the cavity 208 of the seat rail 200.

Figure 2:
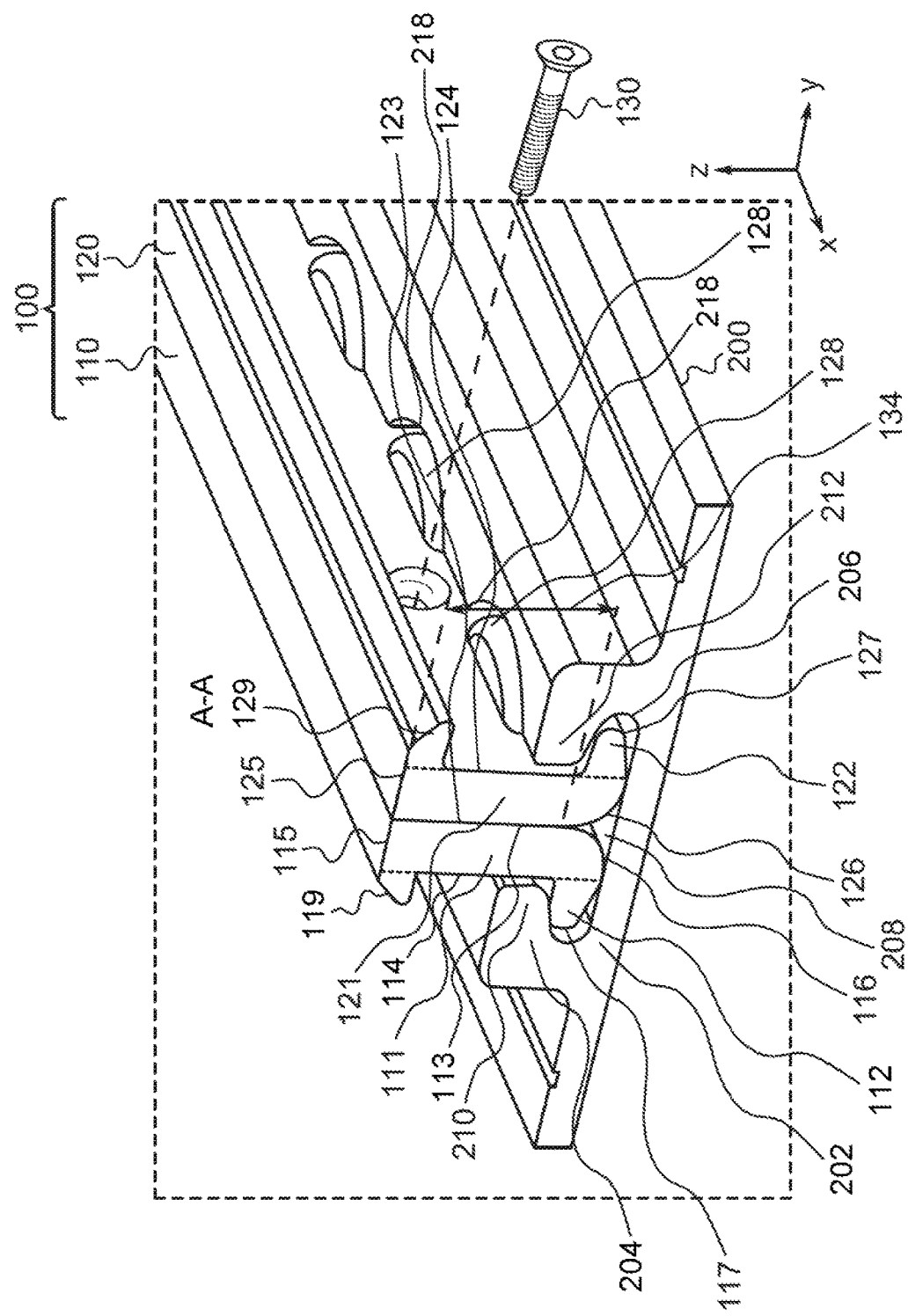
FIG. 2 illustrates a perspective view of a seat rail adapter along the cross section A-A indicated in FIG. 1, comprising two mounting parts, when inserted in a seat rail according to the one embodiment of the invention.

Referring now to the illustrated seat rail adapter 100 in more detail, it can be readily appreciated that the first and the second shaft portion 111, 121 of the first and second mounting parts 110, 120 are formed such that, when in inserted in the seat rail 200, they abut on each other at the respective inner sides 113, 123 thereof (cf. FIG. 2 under reference no. 134). In other words, the inner side 113 of the first shaft portion 111 lies flat on the inner side 123 of the second shaft portion 121.

Notably, also the rounding is provided on the inner side 113, 123 of each of the first and second shaft portion 111, 121. Accordingly, the rounding may prevent that the first and second shaft portions 111, 121 to abut at the whole inner sides 113, 123 on each other. In this case, not the whole inner sides 113, 123 but only a part of the inner sides 113, 123 of the first and second shaft portions 111, 121 abut on each other, preferably, the part which is outside of the seat rail 200.

Further, it can be appreciated that the first and the second shaft portion 111, 121 of the first and second mounting parts 110, 120 are formed such that, when inserted in the seat rail 200, the outer sides 114, 124 of the first and second shaft portions 111, 121 abut on the first and second upper flange portion 210, 212 of the seat rail 200. In other words, the outer sides 114, 124 of the first and second shaft portions 111, 121 lie flat on the first and second upper flange portions 210, 212 of the seat rail 200.

Consequently, the first and second shaft portions 111, 121 are configured to abut on each other, and at the same time to abut on the first and second upper flange portions 210, 212 within the gap 214 of the seat rail 200 in order to improve the stable mounting of objects on the seat rail adapter 100. Thereby, when the first and second mounting parts are inserted in the cavity 208, they are blocked from displacing along a lateral direction (i.e. along the y-axis in FIG. 1).

Referring now to the illustrated seat rail adapter 100 in further detail, it can be readily appreciated that the seat rail adapter 100 also comprises a fastening element 130 for fastening the first shaft portion 111 to the second shaft portion 121, namely when the first and second mounting parts 110, 120 are inserted into the cavity 208. The fastening element 130 is one of a screw, a bolt, a nut or another element suitable for providing a releasable connection between the two mounting parts.

Consequently, the fastening element 130 enables fastening the first and second mounting parts 110, 120. Thereby, when the first and second mounting parts are inserted in the cavity 208, they are blocked from displacing with a swivel movement, namely preventing the removal of the first and second mounting parts 110, 120 from the seat rail 200.

Referring now to the illustrated seat rail adapter 100 in even more detail, it can be readily appreciated that in addition to the first and second hook portions 112, 122, the first and second mounting parts 110, 120 comprise a first and second structure 128 which engages with a first and second counter structure 216, 218 on the first and second upper flange portions 210, 212 of the seat rail 200.

On the outer side 114 of the first shaft portion 111, namely at a section above the first hook portion 112, the first shaft portion 111 is provided with a first structure (not shown in FIG. 1) that is configured to engage a corresponding first counter structure 216 provided at a tip of the first upper flange portion 210. The first counter structure 216 is provided at the tip which points in the direction of the second upper flange portion 212 of the seat rail 200 (i.e. points towards the gap 214).

Also, on the outer side 124 of the second shaft portion 121, namely at a section above the second hook portion 122, the second shaft portion 121 is provided with a second structure 128 that is configured to engage a corresponding second counter structure 218 provided at a tip of the second upper flange portion 212. The second counter structure 218 is provided at the tip which points in the direction of the first upper flange portion 210 of the seat rail 200 (i.e. points towards the gap 214).

In more detail, the first structure (not shown in FIG. 1) on the outer side 114 of the first shaft portion 111 is formed as a plurality of subsequent widenings and neckings alternating along the first longitudinal adapter axis 110a (i.e. extending along the x-axis in FIG. 1). Particularly, the widenings of the first structure are formed as segments of a cylinder, whereas the neckings of the first structure are formed as flat surfaces. For the first structure, the distance between two consecutive widenings or between two consecutive neckings corresponds to the grid pitch 220.

Further, the second structure 128 on the outer side 124 of the first shaft portion 121 is formed as a plurality of subsequent widenings and neckings alternating along the second longitudinal adapter axis 120a (i.e. extending along the x-axis in FIG. 1). Particularly, the widenings of the second structure 128 are formed as segments of a cylinder, whereas the neckings of the second structure 128 are formed as flat surfaces. For the second structure, the distance between two consecutive widenings or between two consecutive neckings corresponds to the grid pitch 220.

The first structure on the outer side 114 of the first shaft portion 111 is adapted to engage with the first counter structure 214 that is correspondingly formed as neckings and widenings alternating along the rail longitudinal axis 201 (i.e. extending along the x-axis in FIG. 1). Accordingly, for the first counter structure 214 the neckings are formed as segments of a cylinder, whereas the widenings are formed as flat sections.

The second structure 128 on the outer side 124 of the second shaft portion 121 is adapted to engage with the second counter structure 218 that is correspondingly formed as neckings and widenings alternating along the rail longitudinal axis 201 (i.e. extending along the x-axis in FIG. 1). Accordingly, for the second counter structure 218 the neckings are formed as segments of a cylinder, whereas the widenings are formed as flat sections.

In other words, the neckings of the first structure on the outer side 114 of the first shaft portion 111 and the widenings of the first counter structure 216 on the first upper flange portion 210 are formed as flat sections and are provided in-between (i.e. connecting) two adjacent segments of a cylinder, namely those which are formed by the widenings of the first structure on the outer side 124 and by the neckings of the first counter structure 216 on the first upper flange portion 210 of the seat rail 200.

The neckings of the second structure on the outer side 124 of the second shaft portion 121 and the widenings of the second counter structure 218 on the second upper flange portion 212 are formed as flat sections and are provided in-between (i.e. connecting) two adjacent segments of a cylinder, namely those which are formed by the widenings of the second structure on the outer side 124 and by the neckings of the first counter structure 218 on the first upper flange portion 210 of the seat rail 200.

Consequently, the first and second structures 128 on the first and second shaft portions 111, 121 are configured to engage with first and second counter of the seat rail 200 in order to further improve the stable mounting of objects on the seat rail adapter 100. Thereby, when the first and second mounting parts are in engagement, they are blocked from displacing along a longitudinal direction (i.e. along the x-axis in FIG. 1).

Referring now to the illustrated seat rail adapter 100 in even more detail, it can be readily appreciated that each of the first and second mounting parts respectively comprises a first and second overhang 119, 129. The first and second overhangs 119, 129 project from the outer sides 114, 124 at the upper ends 115, 125 of the first and second shaft portions 111, 121, respectively.

The first and second overhangs 119, 129 are configured to further enlarge, together with the upper ends 115, 125 of the first and second shaft portions 111, 121 the support for mounting the object, when the first and second mounting parts 110, 120 are inserted into the cavity 208. In particular, the first and second overhangs 119, 129 are configured form together with the upper ends 115, 125 of the first and second shaft portions 111, 121 an enlarged flat surface to support the mounting of objects thereon.

The first and second overhangs 119, 129 of the first and second mounting parts 110, 120 enable a flexible mounting on the seat rail adapter 200 with an under grip. The first and second overhangs 119, 129 are horizontally first and second overhangs which are overhanging the first and second shafts portion 111, 121, and are respectively facing in an outward direction. Thereby, objects can be slidably mounted on the flat surface when the first and second mounting parts 110, 120 are inserted into the seat rail 200.

Consequently, the overhangs 119, 129 are configured to guide the sliding movement along the first and second longitudinal adapter axis 110a, 120a (i.e. along the x-axis) of the seat rail adapter 100. Thereby, after sliding into position the object may be flexibly mounted in a position which is not restricted by a grid pitch 220 of the seat rail 200.

Referring now to FIG. 2, a perspective view of a seat rail adapter according to the one embodiment of the invention is pictured along the cross section A-A (indicated in FIG. 1). The seat rail adapter comprises the first and second mounting parts 110, 120 that are inserted in a seat rail 200. FIGS. 3-11 illustrate a procedure of inserting the respective seat rail adapter of FIG. 2 in a seat rail, also with a view on the cross section A-A (indicated in FIG. 1).

The illustrated seat rail adapter of FIG. 2-11 is the same seat rail adapter 100 already described with respect to FIG. 1 such that the details thereof have been omitted for conciseness reasons. Moreover, these drawings help in understanding how the mounting parts 110, 120 of the seat rail adapter 100 are inserted through the gap and engage with the cavity 208 of the seat rail 200, thereby enabling the stable mounting of object onto the seat rail 200.

Further to the procedure of inserting the first and second mounting part 110, 120 in the seat rail 200 shown in FIGS. 3-11, where firstly the seat rail 200 is provided.

Then, a second mounting part 120 of the seat rail adapter 100 is inserted through the gap 214 into the cavity 208 of the seat rail 200, such that the second hook portion 122 of the second mounting part 120 is engaged with the second cavity section 208b of cavity 208 inside the seat rail 200, and the second shaft portion 121 of the second mounting part 120 extends through the gap 214 to outside of the seat rail 200.

And finally, a first mounting part 110 of the seat rail adapter 100 is inserted through the gap 214 into the cavity 208 of the seat rail 200, such that the first hook portion 112 of the first mounting part 110 is engaged with the first cavity section 208a of cavity 208 inside the seat rail 200, and a first shaft portion 111 of the first mounting part 110 extends through the gap 214 to outside of the seat rail 200.

From FIGS. 3-11 in can be readily appreciated that due to the rounding on the inner side 113 at the lower end 116 of the first shaft portion 111 of the first mounting part 110, the insertion of the first mounting part 110 into the cavity 208 is enabled by a swivel movement, when the second mounting part 120 is already inserted in the cavity 208.

Figure 11:
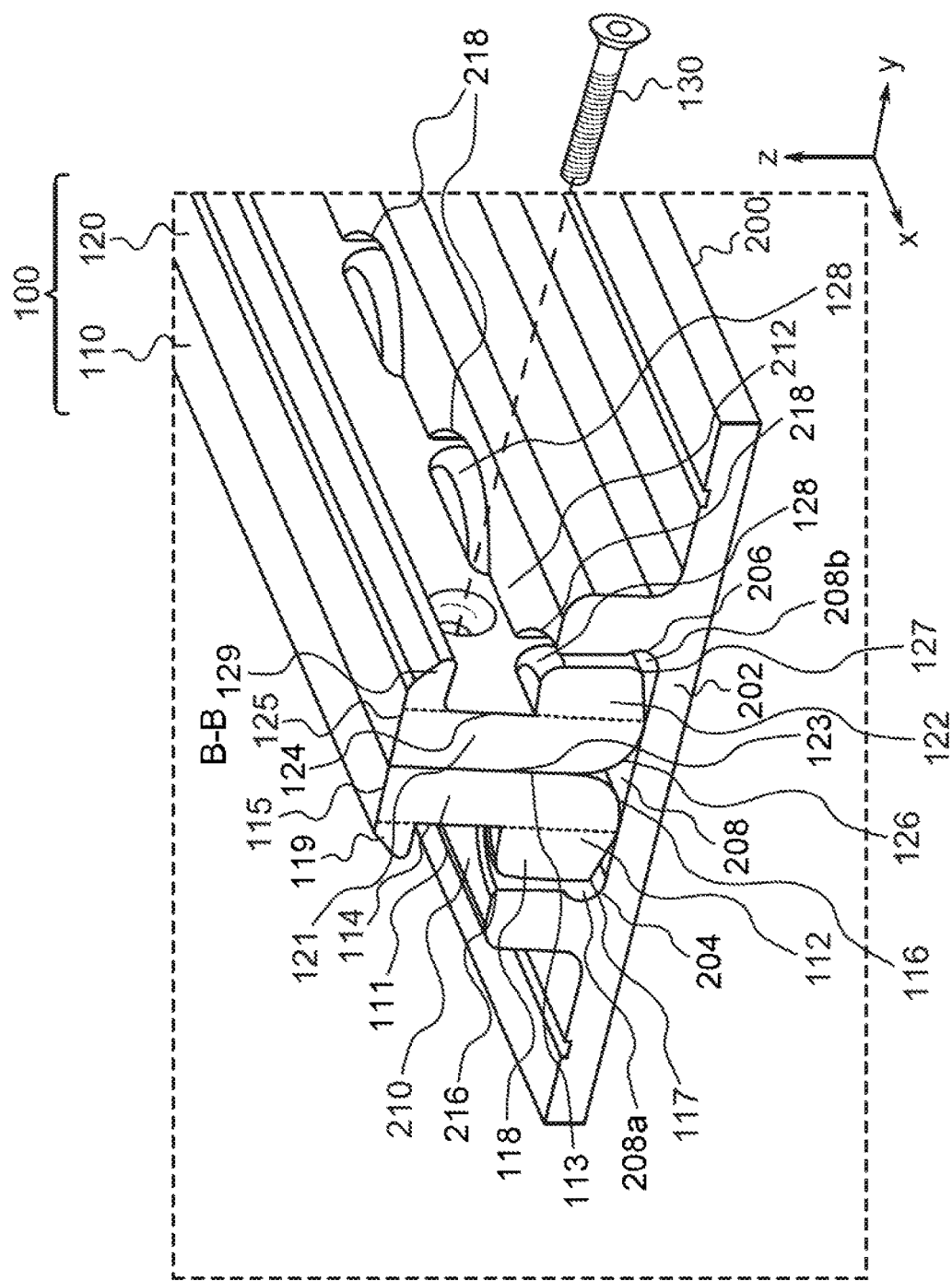
FIG. 11 shows another perspective view of a seat rail adapter along the cross section B-B indicated in FIG. 1, comprising two mounting parts, when inserted in a seat rail according to the one embodiment of the invention.

Referring now to FIG. 11, another perspective view of a seat rail adapter according to the one embodiment of the invention is pictured along the cross section B-B (indicated in FIG. 1). The seat rail adapter comprises the first and second mounting parts 110, 120 that are inserted in a seat rail 200. FIGS. 12-19 illustrate a procedure of inserting the respective seat rail adapter of FIG. 11 in a seat rail, also with a view on the cross section B-B (indicated in FIG. 1).

The seat rail adapter illustrated in FIG. 11-19, is the same seat rail adapter 100 already described with respect to FIG. 1, such that the details thereof have been omitted for conciseness reasons. Moreover, these drawings also help in understanding how the mounting parts 110, 120 of the seat rail adapter 100 are inserted through the gap and engage with the cavity 208 of the seat rail 200, thereby enabling the stable mounting of object onto the seat rail 200. Further to the procedure of inserting the first and second mounting part 110, 120 in the seat rail 200 is shown in FIGS. 12-19.

Notably, the figures further detail the engagement of the first and second structure 118, 128 in the respective first and second counter structures 216, 218 on the first and second upper flange portions 210, 212 of the seat rail 200.

Figure 20:
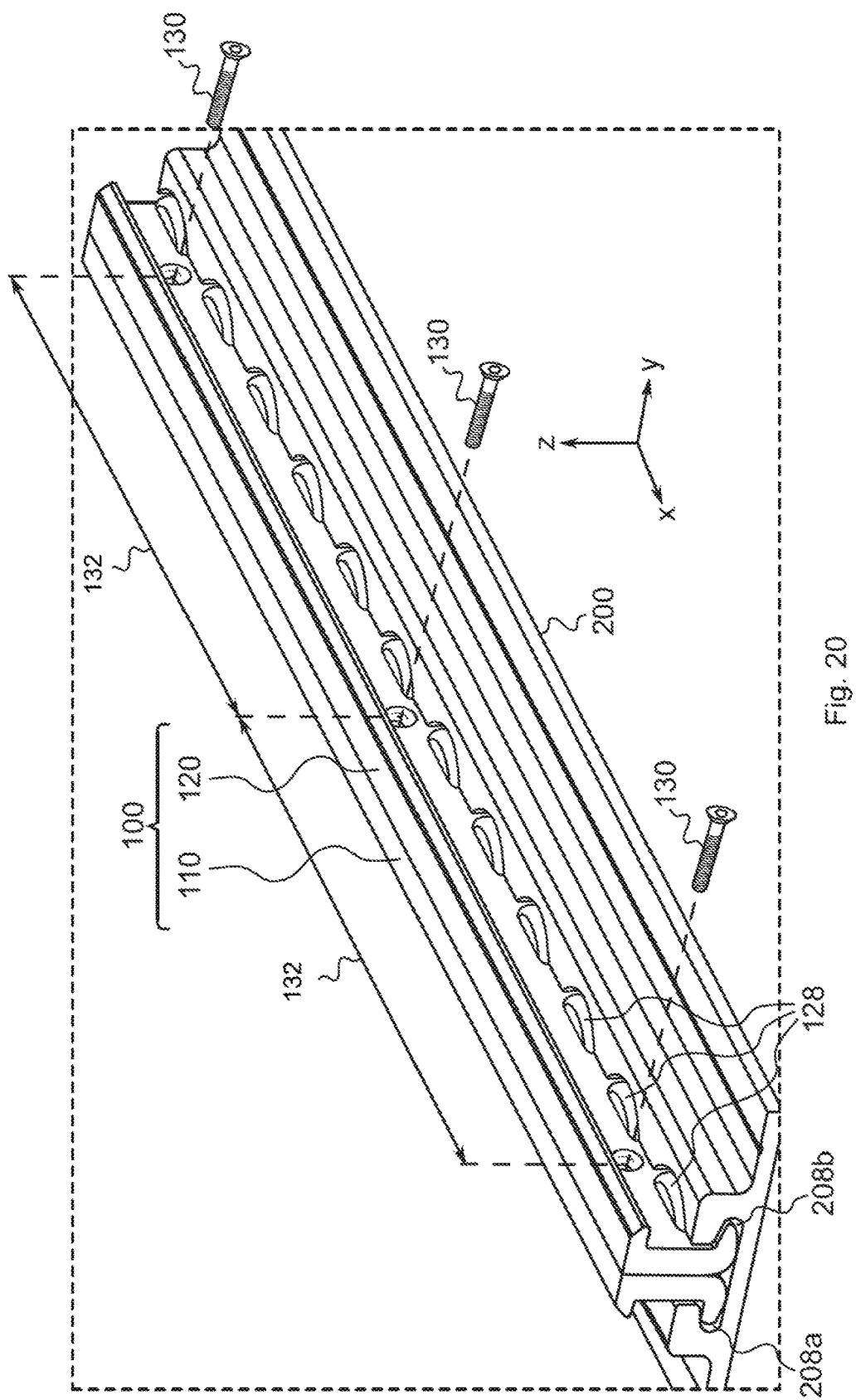
FIG. 20 illustrates a reduced perspective view of a seat rail adapter with fastening elements in the inserted state in a seat rail according to another embodiment of the invention.

Finally, referring to FIG. 20 a reduced perspective view of a seat rail adapter according to another embodiment of the invention is shown for flexibly mounting an object to a seat rail. The illustrated seat rail adapter is the same seat rail adapter 100 already described with respect to FIG. 1, such that the details thereof have been omitted for conciseness reasons.

This figure further details the spacing between two adjacent fastening elements 130 of the first and second mounting parts 110, 120 of the seat rail adapter 100. As shown, fastening elements 130 are provided at a distance 132 which is five times the grid pitch 220. Since the grid pitch 220 of a seat rail 200 is conventionally 2.54 cm (i.e. 1 inch), the distance 132 between the fastening elements 130 amounts to 12.7 cm (i.e. 5 inches).

The first and second mounting parts 110, 120 of the seat rail adapter 100 can be provided along the entire length of the seat rail in the vehicle cabin, at least in a section where the flexibly mountable seats are being provided. In other words, not the entire length of the vehicle cabin but sections thereof may be provided with the first and second mounting parts 110, 120 of the seat rail adapter 100 in order to allow, at least in this section, the seats to be adjustable without restrictions of the grid of the seat rail.

For this purpose, a plurality of the seat rail adapters 100 are arranged one after the other in the seat rail 200, namely such that the seat rail adapters 100 continuously enable the mounting of the objects thereon. In other words, each one of the first and second mounting parts 110, 120 of one of the seat rail adapters 100 contacts the respective preceding and succeeding mounting parts 110, 120 of another of the seat rail adapters 100, thereby preventing gaps in-between neighboring mounting parts 110, 120.

For continuously providing seat rail adapters in the seat rail 200, the first and second mounting parts 110, 120 of each seat rail adapter 100 have a length in the longitudinal direction (i.e. along the x-axis in FIG. 20) of, for instance, 101.6 cm (i.e. 40 inches). Thereby, the first and second mounting parts 110, 120 remain manageable and operable, and can manually be inserted into the inserted state in the seat rail 200, as described before. At the same time, this length provides an additional amount of strength and structural stability, in that it may compensate manufacturing tolerances of the seat rail 200. Notably, also different lengths of the mounting parts 110, 120 of each seat rail adapters are possible, for instance, 152.4 cm (60 inches) or 203.2 cm (i.e. 80 inches).

Advantageously, in case of continuously provided seat rail adapters 100, the inserted first and second mounting parts 110, 120 may overlap in the first and second longitudinal adapter axis 110a, 120a (i.e. along the x-axis in FIG. 20), in order to provide further strength and structural stability when mounting objects thereon. Thereby, the first and second mounting parts 110, 120 of one seat rail adapter 100 do not only abut on each other in the sections 115, 125 as described above, but also abut, due to the overlap, on the preceding or succeeding other mounting part 120, 110, respectively.

In more detail, on the inner side 113 of the first shaft portion 111, the first mounting part 110 of seat rail adapter 100 abuts on the second mounting part 120 of the same seat rail adapter 100 and the preceding or subsequent second mounting part of a different seat rail adapter along the first longitudinal adapter axis 110a (i.e. along the x-axis in FIG. 20). At the same time, on the inner side 123 of the second shaft portion 121, the second mounting part 120 of one seat rail adapter 100 abuts on the first mounting part 110 of the same seat rail adapter 100 and the subsequent or preceding first mounting part of a different seat rail adapter along the second longitudinal adapter axis 120a (i.e. along the x-axis in FIG. 20).

For this overlapped configuration of continuously provided seat rail adapters, the length of the mounting parts 110, 120 of each seat rail adapter 100 is configured in correspondence with the distance 132 between two adjacent fastening elements 130 of the two mounting parts 110, 120 of the seat rail adapter 100. Particularly, the length of the mounting parts 110, 120 is an integer multiple of the distance 132 between two adjacent fastening elements 130. For instance, if the distance 132 is amounts to 12.7 cm (i.e. 5 inches), then the length of the mounting parts are integer multiples of this 12.7 cm (i.e. multiples of 5 inches).

Thereby, it can be ensured that the fastening elements 130 equidistantly secure the mounting parts 110, 120 in the overlapped configuration of continuously provided seat rail adapters onto each other, hence, allowing for same strength in mounting objects thereon.

The mounting parts 110, 120 can also be manufactured in advance with corresponding holes, screw threads etc., for the fastening elements 130 to engage the secure connection there between. Accordingly, also in this advantageous configuration with the overlap, the mounting parts 110, 120 of the seat rail adapter 100 may have a length in the first and second longitudinal adapter axis 110a, 120a (i.e. along the x-axis in FIG. 20) of, for instance, 101.6 cm (i.e. 40 inches).

REFERENCE NUMERALS

100 Seat rail adapter
110 first mounting part
110a first longitudinal adapter axis
111 first shaft portion
112 first hook portion
113 inner side
114 outer side
115 upper end
116 lower end
117 tip of the first hook portion
118 first structure
119 first overhang
120 second mounting part
120a second longitudinal adapter axis
121 second shaft portion
122 second hook portion
123 inner side
124 outer side
125 upper end
126 lower end
127 tip of the second hook portion
128 second structure
129 second overhang
130 fastening element
132 distance
134 section of abutment
200 seat rail
201 rail longitudinal axis
202 lower flange portion
204 first web portion
206 second web portion
208 cavity
208a first cavity section
208b second cavity section
210 first upper flange portion
212 second upper flange portion
214 gap
216 first counter structure
218 second counter structure
220 grid pitch While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A seat rail adapter for flexibly mounting an object onto a seat rail,
    the seat rail extending along a rail longitudinal axis and having a U-shaped profile with a lower flange portion, a first web portion extending upwards from the lower flange portion, a second web portion extending upwards from the lower flange portion in a position spaced apart from the first web portion so as to form a cavity between the lower flange portion, the first web portion and the second web portion, with a first upper flange portion extending from the first web portion inwardly towards the second web portion so as to form a first cavity section between the lower flange portion, the first web portion and the first upper flange portion, and with a second upper flange portion extending from the second web portion inwardly towards the first web portion so as to form a second cavity section between the lower flange portion, the second web portion and the second upper flange portion, wherein a gap is provided between the first upper flange portion and the second upper flange portion in order to allow access to the cavity from outside the seat rail, the seat rail adapter comprising:

a first mounting part and a second mounting part, the first and second mounting parts configured to be inserted through the gap and to engage with the cavity of the seat rail, wherein the first mounting part extends along a first longitudinal adapter axis and has a cross-profile comprising a first shaft portion and a first hook portion, wherein the first shaft portion has an inner side and an opposite outer side as well as an upper end and an opposite lower end, and wherein the first hook portion projects from the outer side at the lower end of the first shaft portion, wherein the second mounting part extends along a second longitudinal adapter axis and has a cross-profile comprising a second shaft portion and a second hook portion, wherein the second shaft portion has an inner side and an opposite outer side as well as an upper end and an opposite lower end, and wherein the second hook portion projects from the outer side at the lower end of the second shaft portion, wherein the first and second mounting parts are formed to engage with the cavity of the seat rail in such a manner that the first hook portion engages with the first cavity section while the second hook portion engages with the second cavity section, that the first shaft portion and the second shaft portion extend from the cavity through the gap to outside the seat rail and the inner side of the first shaft portion lies opposite the inner side of the second shaft portion, and that the first longitudinal adapter axis and the second longitudinal adapter axis are aligned with the rail longitudinal axis, and wherein the inner side at the lower end of the first shaft portion of the first mounting part or the inner side at the lower end of the second shaft portion of the second mounting part is rounded so as to allow insertion of one of the first and second mounting parts into the cavity by a swivel movement, when the other one of the first and second mounting parts is readily inserted in the cavity, and wherein, when the first and second mounting parts are inserted into the cavity, the first shaft portion and the second shaft portion abut one another.

2. The seat rail adapter according to claim 1, wherein the first and second mounting parts are formed such that the swivel axis for inserting one of the first and second mounting parts into the cavity, when the other one of the first and second mounting parts is already inserted, extends along a tip of the hook portion of the one mounting part.

3. The seat rail adapter according to claim 1, wherein, when the first and second mounting parts are inserted into the cavity, the first shaft portion and the second shaft portion extend in parallel through the gap to the outside of the seat rail.

4. The seat rail adapter according to claim 1, wherein, when the first and second mounting parts are inserted into the cavity, the projecting first and second hook portions both point in opposite directions.

5. The seat rail adapter according to claim 1, further comprising a fastening element for fastening the first shaft portion to the second shaft portion, when the first and second mounting parts are inserted into the cavity.

6. The seat rail adapter according to claim 5, wherein the fastening element is one of a screw, a bolt, a nut or another element suitable for providing a releasable connection between the two mounting parts.

7. The seat rail adapter according to claim 1, wherein, when the first and second mounting parts are inserted into the cavity, the upper end of the first shaft portion and the upper end of the second shaft portion are configured to form, together, a support for flexibly mounting the object.

8. The seat rail adapter according to claim 1, wherein the first shaft portion at its outer side above the first hook portion is provided with a first structure configured to engage with a corresponding first counter structure provided at a tip of the first upper flange portion that points to the second upper flange portion of the seat rail, or wherein the second shaft portion at its outer side above the second hook portion is provided with a second structure configured to engage with a corresponding second counter structure provided at a tip of the second upper flange portion that points to the first upper flange portion of the seat rail.

9. The seat rail adapter according to claim 8, wherein the first structure is formed as a plurality of subsequent widenings and neckings alternating along the first longitudinal adapter axis, adapted to engage with the first counter structure formed as corresponding neckings and widenings alternating along the rail longitudinal axis, or wherein the second structure is formed as a plurality of subsequent widenings and neckings alternating along the second longitudinal adapter axis, adapted to engage with the second counter structure formed as corresponding neckings and widenings alternating along the rail longitudinal axis.

10. The seat rail adapter according to claim 9, wherein the widenings of the first structure and the neckings of the first counter structure are formed as segments of a cylinder, or wherein the widenings of the second structure and the neckings of the second counter structure are formed as segments of a cylinder.

11. The seat rail adapter according to claim 10, wherein the neckings of the first structure and the widenings of the first counter structure are formed as flat sections connecting two adjacent segments of a cylinder, or wherein the neckings of the second structure and the widenings of the second counter structure are formed as flat sections connecting two adjacent segments of a cylinder.

12. A seat rail arrangement comprising:

a seat rail extending along a rail longitudinal axis and having a U-shaped profile with a lower flange portion, a first web portion extending upwards from the lower flange portion, a second web portion extending upwards from the lower flange portion in a position spaced apart from the first web portion so as to form a cavity between the lower flange portion, the first web portion and the second web portion, with a first upper flange portion extending from the first web portion inwardly towards the second web portion so as to form a first cavity section between the lower flange portion, the first web portion and the first upper flange portion, and with a second upper flange portion extending from the second web portion inwardly towards the first web portion so as to form a second cavity section between the lower flange portion, the second web portion and the second upper flange portion, wherein a gap is provided between the first upper flange portion and the second upper flange portion in order to allow access to the cavity from outside the seat rail; and a seat rail adapter comprising:
   a first mounting part and a second mounting part, the first and second mounting parts configured to be inserted through the gap and to engage with the cavity of the seat rail,
   wherein the first mounting part extends along a first longitudinal adapter axis and has a cross-profile comprising a first shaft portion and a first hook portion, wherein the first shaft portion has an inner side and an opposite outer side as well as an upper end and an opposite lower end, and wherein the first hook portion projects from the outer side at the lower end of the first shaft portion,
   wherein the second mounting part extends along a second longitudinal adapter axis and has a cross-profile comprising a second shaft portion and a second hook portion, wherein the second shaft portion has an inner side and an opposite outer side as well as an upper end and an opposite lower end, and wherein the second hook portion projects from the outer side at the lower end of the second shaft portion,
   wherein the first and second mounting parts are formed to engage with the cavity of the seat rail in such a manner
     that the first hook portion engages with the first cavity section while the second hook portion engages with the second cavity section,
     that the first shaft portion and the second shaft portion extend from the cavity through the gap to outside the seat rail and the inner side of the first shaft portion lies opposite the inner side of the second shaft portion, and
     that the first longitudinal adapter axis and the second longitudinal adapter axis are aligned with the rail longitudinal axis, and
   wherein the inner side at the lower end of the first shaft portion of the first mounting part or the inner side at the lower end of the second shaft portion of the second mounting part is rounded so as to allow insertion of one of the first and second mounting parts into the cavity by a swivel movement, when the other one of the first and second mounting parts is readily inserted in the cavity.

13. A cabin arrangement comprising:
a seat rail extending along a rail longitudinal axis and having a U-shaped profile with a lower flange portion, a first web portion extending upwards from the lower flange portion, a second web portion extending upwards from the lower flange portion in a position spaced apart from the first web portion so as to form a cavity between the lower flange portion, the first web portion and the second web portion, with a first upper flange portion extending from the first web portion inwardly towards the second web portion so as to form a first cavity section between the lower flange portion, the first web portion and the first upper flange portion, and with a second upper flange portion extending from the second web portion inwardly towards the first web portion so as to form a second cavity section between the lower flange portion, the second web portion and the second upper flange portion, wherein a gap is provided between the first upper flange portion and the second upper flange portion in order to allow access to the cavity from outside the seat rail;

an object; and a seat rail adapter for flexibly mounting the object onto the cabin, wherein the seat rail adapter comprises:
   a first mounting part and a second mounting part, the first and second mounting parts configured to be inserted through the gap and to engage with the cavity of the seat rail,
   wherein the first mounting part extends along a first longitudinal adapter axis and has a cross-profile comprising a first shaft portion and a first hook portion, wherein the first shaft portion has an inner side and an opposite outer side as well as an upper end and an opposite lower end, and wherein the first hook portion projects from the outer side at the lower end of the first shaft portion,
   wherein the second mounting part extends along a second longitudinal adapter axis and has a cross-profile comprising a second shaft portion and a second hook portion, wherein the second shaft portion has an inner side and an opposite outer side as well as an upper end and an opposite lower end, and wherein the second hook portion projects from the outer side at the lower end of the second shaft portion,
   wherein the first and second mounting parts are formed to engage with the cavity of the seat rail in such a manner
     that the first hook portion engages with the first cavity section while the second hook portion engages with the second cavity section,
     that the first shaft portion and the second shaft portion extend from the cavity through the gap to outside the seat rail and the inner side of the first shaft portion lies opposite the inner side of the second shaft portion, and
     that the first longitudinal adapter axis and the second longitudinal adapter axis are aligned with the rail longitudinal axis, and
   wherein the inner side at the lower end of the first shaft portion of the first mounting part or the inner side at the lower end of the second shaft portion of the second mounting part is rounded so as to allow insertion of one of the first and second mounting parts into the cavity by a swivel movement, when the other one of the first and second mounting parts is readily inserted in the cavity.

14. The cabin arrangement according to claim 13, wherein the object to be mounted is one of a seat, a structural element, or cargo.

\* \* \* \* \*